United States Patent [19]
Davis

[11] Patent Number: 4,582,203
[45] Date of Patent: Apr. 15, 1986

[54] FISHING ROD HOLDER

[76] Inventor: Henry F. Davis, P.O. Box 1603, Williamsburg, Va. 23183

[21] Appl. No.: 704,092

[22] Filed: Feb. 22, 1985

[51] Int. Cl.[4] ............................................. A47F 7/00
[52] U.S. Cl. .................... 211/70.8; 211/60.1
[58] Field of Search .............. 211/70.8, 64, 65, 68, 211/60.1, 89, 70.6, 70.7, 70.5, 70.2, 120; 224/922

[56] References Cited

U.S. PATENT DOCUMENTS

| | | | |
|---|---|---|---|
| 525,132 | 8/1894 | Burke . | |
| 1,222,728 | 4/1917 | Brown, Jr. | 211/89 X |
| 1,315,823 | 9/1919 | Dugan | 211/89 |
| 1,701,783 | 2/1929 | Law | 211/89 |
| 1,963,462 | 6/1934 | Hammer . | |
| 2,291,381 | 7/1942 | Drake | 211/70.6 X |
| 2,430,624 | 11/1947 | Vollmer | 211/89 X |
| 2,497,446 | 2/1950 | Golding et al. | 211/89 X |
| 2,721,680 | 10/1955 | Steckman | 211/70.8 X |
| 2,852,218 | 9/1958 | Stipes . | |
| 2,959,295 | 11/1960 | Howard et al. | 211/64 |
| 3,146,889 | 9/1964 | Franco | 211/68 |
| 3,294,247 | 12/1966 | Norrington | 211/64 |
| 3,315,816 | 4/1967 | Mallory | 211/70.6 |
| 3,421,632 | 1/1969 | Wood | 211/70.8 |
| 3,477,586 | 11/1969 | Haluska | 211/64 |
| 3,635,433 | 1/1972 | Anderson . | |
| 4,109,796 | 8/1978 | Mitchell . | |

Primary Examiner—J. Franklin Foss
Assistant Examiner—Blair Johnson
Attorney, Agent, or Firm—Sandler & Greenblum

[57] ABSTRACT

The present invention relates to an apparatus designed to hold fishing rods comprising two members, one formed from metal tubing encased in a protective material to form two legs at its ends with a plurality of generally sinusoidally configured, U-shaped recesses between the legs, each recess adapted to hold the stem of a respective fishing rod, and the second member formed from a substantially C-shaped portion of tubing in which one of two walls is cut to form a plurality of slots, each slot being adapted to hold the handle of a respective fishing rod.

4 Claims, 5 Drawing Figures

FISHING ROD HOLDER

BACKGROUND OF THE INVENTION

1. Field of the Invention

The present invention relates to an apparatus designed to hold fishing rods and other elongated items securely by their bases and stems to prevent movement and entanglement when rods are being transported. This apparatus is designed for use primarily on boats, but it can be adapted to any mode of transportation or other use requiring secure stowage.

2. Description of the Prior Art

Several apparatus designed to hold fishing rods are known. Two-piece holders in which a butt portion adapted to support the handles of rods is connected to a front piece adapted to hold the stems of rods by means of frame elements is disclosed by STIRES, U.S. Pat. No. 2,852,218. Similarly, a two-piece holder comprising a generally tubular holding member with a hole cut out of its upper surface for receiving the handle of a rod and a locking mechanism attached to a boatwall for locking the stems of rods inserted into the mechanism is disclosed by ANDERSON, U.S. Pat. No. 3,635,433. One-piece holders are known, as shown by HAMMER, U.S. Pat. No. 1,963,463, and BURKE, U.S. Pat. No. 525,132, which employ cradles and looped wire, respectively, in which to anchor rod stems. Finally, identically designed, two-piece holders comprising loop assemblies that receive rod handles and stems are disclosed by MITCHELL, U.S. Pat. No. 4,109,796.

None of the prior art, however, discloses a two-piece holder comprising a first, generally tubular member with U-shaped recesses which is adapted to hold the stem of fishing rods or other elongated elements and a notched base which is adapted to hold the handles of the rods.

OBJECTS OF THE INVENTION

It is a general object of the present invention to provide a unique means for securely stowing fishing rods and other elongated objects on a boat or other vehicle.

Another object of the invention is to provide an apparatus that permits ready access to fishing poles without the need to unlock and pry apart elements of the apparatus.

Another object of the invention is to provide an apparatus that stows fishing rods in a slightly elevated position so that the handles of the rods rest flush with one piece of the apparatus and so that movement of the rods will be prevented.

Still another object of the invention is to provide a holder that is easily constructed from a limited number of materials to facilitate production.

A further object of the invention is to provide an apparatus that is easily mounted on a boat or other vehicle so that installation time and cost is minimal.

The above and other objects will become more fully apparent to those of ordinary skill in the art from a review of the following description taken in connection with the accompanying drawings.

SUMMARY OF THE INVENTION

The present invention provides for a two-piece apparatus that meets the above-mentioned needs. One piece is formed from metal tubing encased in a protective material to form two legs at its ends with a plurality of generally sinusoidally configured, U-shaped recesses between the legs. These recesses are adapted to support or cradle the stems of fishing rods. The entire piece is configured in two dimensions, the legs extending vertically and the recesses extending vertically and horizontally.

The other piece comprises a substantially C-shaped portion of tubing having a base and two walls, the front wall being notched with a plurality of generally U-shaped slots adapted to receive the handles of fishing rods that have their stems positioned within respective recesses of the first piece and the back wall being generally curved and overhanging the base and adapted to retain the handles of fishing rods in the U-shaped slots of the frontwall.

The first piece can be attached to a boat or other vehicle by a fastening that vertically anchors the piece to the boat or vehicle surface. Similarly, the second piece can have holes placed in its base so that it can be attached by similar means to a second, distinct surface of the boat or vehicle. The recesses and the slots of the first and second pieces, respectively, need to be generally aligned before the pieces are secured so that the fishing rods may be stowed securely and evenly from one another.

In a first aspect thereof, the present invention is provided for by an apparatus for holding fishing rods which comprises a generally tubular first member comprising means for holding the stems of a plurality of such rods. The apparatus also incorporates a substantially C-shaped second member which comprises means for holding the handles of fishing rods, the second member having a front wall and a rear wall, the walls including the means for holding the fishing rod handle is a specific position. The first member comprises two downwardly extending legs and a plurality of generally sinusoidal, U-shaped recesses intermediate the legs. Each of the legs has a lower, free end and an upper end, and the recesses comprise stem holding means which are located adjacent the upper end of the legs. The first member comprises metallic tubing which is encased in a soft, substantially protective material. The second member comprises a base, the front wall of the second member being generally vertical and having a plurality of spaced slots therein, and the rear wall being generally curved and overhanging the base. The slots each comprise means for receiving the handle of a respective fishing rod. The second member comprises plastic material, and both of the first and second members are attached to a single vehicle in spaced relation, the first member being elevated above the second member to elevate the stems of the fishing rods above their respective handles. The number of recesses in the first member equals the number of slots in the second member.

The present invention is provided for in a second aspect thereof by a two-piece fishing rod holder. The holder comprises first and second members. The first member is a generally sinusoidally-shaped member having first and second downwardly extending legs having free lower ends and upper ends which are attached to the generally sinusoidal recessed portions of the first member. Each of the recessed portions comprises means for holding the elongated stem of a fishing rod or pole. The legs of the first member include means for attaching the first member to a generally vertical or horizontal surface on a vehicle. The apparatus also includes a second member which is substantially C-shaped and which has a front wall, a rear wall, and a bottom wall or base connected to the front and rear wall. The C-shaped member has a partially covered top and a plurality of generally arcuate slots along the front wall which are spaced from each other and which each comprise means for receiving the butt or handle end of a respective fishing rod. The recesses on the first member and the slots on the second member are substantially aligned to receive respective ends of the fishing rods.

BRIEF DESCRIPTION OF THE DRAWINGS

The above and other objects, features, and advantages of the present invention will become more fully apparent to one of ordinary skill in the art to which the invention pertains from a detailed review of the drawings, in which like reference numbers are used to identify similar parts throughout, wherein.

DETAILED DESCRIPTION OF THE PREFERRED EMBODIMENTS

Figure 1:
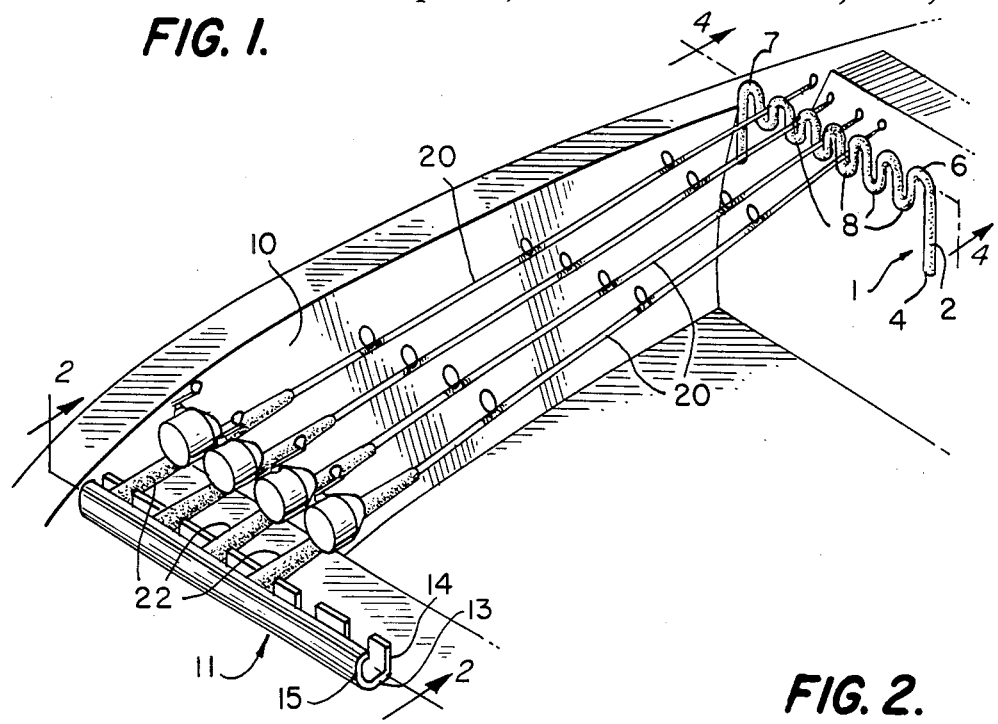
FIG. 1 is a perspective view of the apparatus for holding a plurality of fishing poles, the apparatus being illustrated as attached to a boat.
Figure 4:
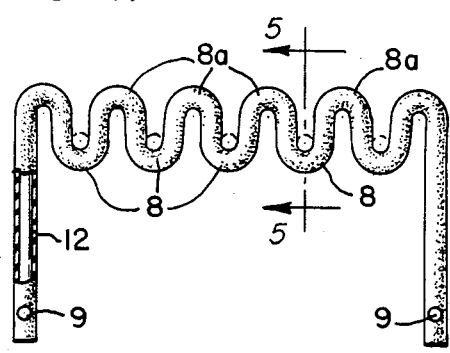
FIG. 4 is a partially cut-away perspective view of the first member as illustrated in FIG. 1.
Figure 3:
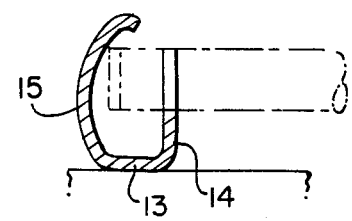
FIG. 3 is a cross-sectional view of the generally U-shaped member of FIG. 1 taken along line 3—3 of FIG. 2.
Figure 5:
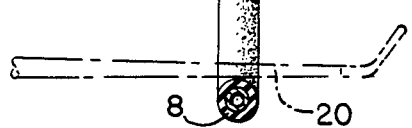
FIG. 5 is a cross-sectional view of the first member taken along line 5—5 of FIG. 4.

The present invention will now be described in more detail with more specific reference to the detailed drawings. As illustrated in FIG. 1, the fishing rod holder apparatus is shown as being comprised of a first member 1 and a second member 11. The first member is a generally tubular member having first and second legs 2 and 3, each of which is downwardly extending and has a free end 4 and 5, respectively. The second end of each leg, ends 6 and 7, respectively, are connected to a generally sinusoidal configuration which has a plurality of recesses or channels 8 which are provided for receiving the tips or stems of respective fishing rods 20, as best illustrated in FIGS. 1 and 4. Opposite the trough of each channel, and positioned between adjacent channels, are a plurality of peaks 8a as best illustrated in FIG. 4. First member or stem holder 1 can comprise any metal which can be deformed into a configuration as illustrated in FIGS. 1 and 3. In one preferred embodiment of the invention, the generally sinusoidal first member comprises copper tubing which is encased in a substantially protective cover such as a plastic compound or rubber which will cushion the stems of fishing rods inserted in recesses 8 and which will prevent them from becoming deformed or otherwise damaged.

Figure 2:
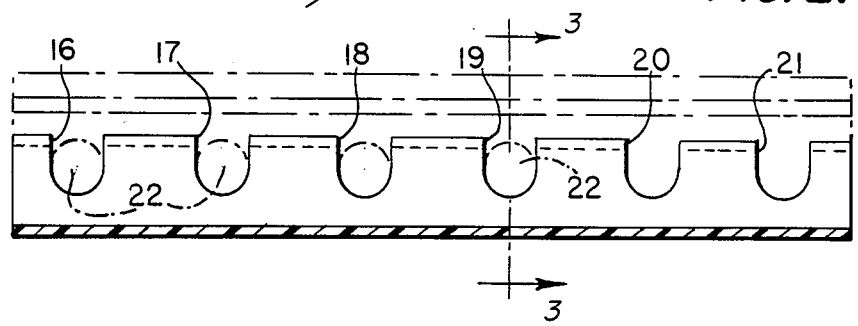
FIG. 2 is a cross-sectional view taken along line 2—2 of FIG. 1.

As illustrated in FIGS. 1 and 2, second member 11 includes a front wall 14, a rear wall 15, and a bottom wall 13 which joins the front and rear walls in a generally C-shaped configuration. The front wall includes a plurality of spaced, generally U-shaped slots 16, 17, 18, 19, 20 and 21. Each of these slots comprises means for receiving the butt or handle end 22 of a respective fishing rod 20. The rear wall overhangs the bottom wall and is adapted to keep the fishing rod butt or handle in a slot to prevent the rod from bouncing out of the slot when the rod is being transported. Although not precisely shown in the figures, these slots are generally provided in a number substantially equal to the number of generally U-shaped recesses 8 in first member 1, and are generally aligned therewith so that a respective slot, e.g., slot 16, and a respective recess 8 will receive opposed ends of the respective fishing rods. This member is formed from a tough plastic material, e.g., polyvinyl chloride.

FIG. 1 illustrates the mounting of first and second members 1 and 11, respectively, on a boat or other vehicle so that fishing rods can be stowed securely therein. Vertical surfaces, such as the side of a boat and the transverse bulkhead of the control housing can serve as mounting surfaces for member 1; and legs 2 and 3, respectively, can be mounted to the vertical surfaces by conventional fastening means. For this reason, apertures 9 can be provided along the free lower ends of each of these legs to receive such means.

Second member 11 can be mounted on the floor or any other horizontal or vertical surface of a vehicle by means of screws driven through base 13. Slots 16–21 are provided for receiving the butt end of the fishing rods. Although not illustrated, the rear wall 15 or bottom wall 13 of second member 11 can be provided with apertures or other conventional fastening elements for attaching the member to a vertical or horizontal support in a boat or other vehicle. When attached, it is preferred to mount the first member higher than the second member to elevate the stems of the fishing rods above their respective handles.

In a second, non-illustrated embodiment of the present application, the sinusoidally configured tubular member 1 has its recesses 8 more closely spaced so that the fishing rods positioned therein are more likely to be pinched or otherwise securely cradled by the recesses. In this fashion, any pitching motion of a boat or other vehicle that might otherwise dislodge fishing rods 20 from the apparatus would be overcome.

It is clear from the above description that other embodiments, features and characteristics of the present invention would be well within the skill of the art of those of ordinary skill in the art to which this invention pertains, and that such features and advantages are considered to be within the scope of the present invention.

What is claimed is:

1. An apparatus for holding elongated articles which comprises two independently movable members which are independently attachable to different portions of a boat or other vehicle, said apparatus comprising:
   (a) a generally tubular first member comprising first and second spaced apart legs and a generally sinusoidal central portion, said generally sinusoidal central portion including a plurality of generally U-shaped holding recesses, each of said recesses being upwardly directed and comprising means for receiving an end of one said elongated article, each of said first and second legs having a lower free end and an upper end attached to said generally sinusoidal central portion, each of said legs having a substantially equal predetermined longitudinal extent, said generally sinusoidal central portion extending downwardly from the respective second ends of said first and second leg over less than half of said predetermined longitudinal extent of said legs, each of said first and second legs having an aperture adjacent said free end, said apertures together comprising means for receiving a fastening element and for attaching said first member to a vertical surface on said boat or vehicle, said tubular member comprising a flexible metallic member covered with a substantially soft, pliable material serving as a cushion, said pliable material being sufficiently flexibile so as to hold ends of elongated objects having a variety of shapes and sizes; and (b) a second, substantially C-shaped second member adapted to be attached to either a horizontal surface or a vertical surface of said boat or vehicle, said second member comprising a substantially straight, vertical front wall, a substantially flat bottom wall connected to said front wall, and a substantially curved rear wall connected to said bottom wall, said second member having an open top portion which is only partially covered by an overhanging portion of said rear wall, said front wall having a plurality of spaced U-shaped slots therein, each of said generally U-shaped slots comprising means for receiving a butt end of a respective one of said elongated articles, said bottom wall comprising means for attaching said second member to a substantially horizontal surface of said boat and said rear wall comprising means for attaching said second member to a substantially vertical surface of said boat.

2. An apparatus in accordance with claim 1 wherein said elongated articles comprise fishing rods.

3. An apparatus in accordance with claim 1 wherein said second member comprises plastic material.

4. An apparatus in accordance with claim 1 wherein the number of recesses in said first member is equal to the number of slots in said second member.

* * * * *